Aug. 7, 1962 A. L. HUBBARD 3,047,997
MOISTENER MECHANISM FOR COTTON HARVESTER
Filed Sept. 4, 1959 3 Sheets-Sheet 1

INVENTOR.
A. L. HUBBARD

BY
C. T. Parker and W. A. Murray
ATTORNEYS

INVENTOR.
A.L. HUBBARD
ATTORNEYS

Aug. 7, 1962     A. L. HUBBARD     3,047,997
MOISTENER MECHANISM FOR COTTON HARVESTER

Filed Sept. 4, 1959     3 Sheets-Sheet 3

*INVENTOR.*
A.L. HUBBARD

BY C.T. Parker and W.A. Murray
ATTORNEYS

United States Patent Office 3,047,997
Patented Aug. 7, 1962

3,047,997
MOISTENER MECHANISM FOR
COTTON HARVESTER
Arthur L. Hubbard, Des Moines, Iowa, assignor to Deere & Company, Moline, Ill., a corporation of Delaware
Filed Sept. 4, 1959, Ser. No. 838,197
12 Claims. (Cl. 56—44)

This invention relates to a cotton harvester and more particularly relates to a moistening mechanism used in conjunction with and for cleaning the conventional type of picking spindles in a cotton harvester. Still more particularly this invention relates to structure which automatically moves the moistener pads into a position for wiping the spindles and further passes cleaning liquid into the moistener pads in response to the cotton harvester being moved into transport position and upon lowering the harvester into harvesting position to automatically move the pads out of contact with the spindles and to also shut off the cleaning liquid from passing into the pads.

It has been conventional in the past to provide moistening mechanism composed of moistener pads in stacked relation and generally fixed in a position which will contact the picking spindles of a cotton harvester each time the picking drum rotates about its axis. Fluid constantly passes into the pads so that upon each revolution of the drum the spindles are recleaned prior to their entering into the cotton plant. In many instances, the spindles will pick up enough trash and juices from the cotton plant so that they require cleaning systematically and constantly throughout the harvesting operation. However, in other instances, conditions of the field will be such that very little or no juices from the plant will remain on the spindles and the trash will be generally non-existent. In these latter instances, the spindles obviously do not require cleaning in each revolution of the picking drum. Consequently, it is desirable that the spindles be cleaned only upon their becoming dirty and not in a continuous manner as has been done previously. The introduction of fluid into the cotton is not necessarily always a desirable feature and also constant contact of the moistening pads with the spindles creates wear on the pads thereby requiring systematic replacement. Therefore, if the moistening and cleaning of the spindles is not necessary, it is preferable that the pads be moved from contact with the spindles and also to have a shut-off means for preventing flow of the fluid into the pads when they are not contacting the spindles.

It is here proposed and it is one of the main objects of the present invention to provide an attachment for a cotton picker which will operate to position the moistening pads adjacent the spindles and will also operate to conduct fluid to the moistener pads only upon the harvesting units being in transport position. By so arranging the moistening system, the moisteners will be effective only upon the picking units being moved from the harvesting position to a transport position. This will be advantageous since in turning at the end of the rows, the picking units are raised to transport position. This will, therefore, cause the spindles to be systematically cleaned through a flushing action at the end of the rows and when the spindles are not picking cotton. A manually operated master valve will be employed to shut off the fluid from the moistener pads when the picker is moving down the row and is for some reason raised or for going from one field to another.

Specifically, it is proposed to provide linkage connected to the lift system of the cotton harvester and extending to a valve in the conduits leading from the liquid container. The linkage opens and shuts the valve to permit fluid to pass into the moisteners upon raising and lowering the harvesting units. Also incorporated in the system is the feature of mounting the moisteners so that the moisteners may swing from a position adjacent the spindles to a position spaced from the spindles and to incorporate within the system a linkage extending to the mechanism for raising and lowering the harvesting units which automatically moves the moisteners into contact with the spindles upon the harvesters being raised to a transport position.

Other objects and purposes of the invention will become apparent to those skilled in the art as the nature of the invention is better understood from the following description and as shown in the acompanying drawings.

The cotton harvester herein referred to is of the type generally shown and described in U.S. Patent 2,719,374 issued to Messrs. F. A. Thomann and R. H. Meier. Similarly, the basic moistener arrangement is of the type shown in U.S. Patent 2,795,096 issued to Mr. R. H. Meier. Since details of the cotton harvester and moistener are shown and described in these two patents, details of such will not be repeated in the present application. Consequently, the description of the harvester as well as the moisteners will be only general and in such detail as is necessary to understand the present invention.

Figure 5:
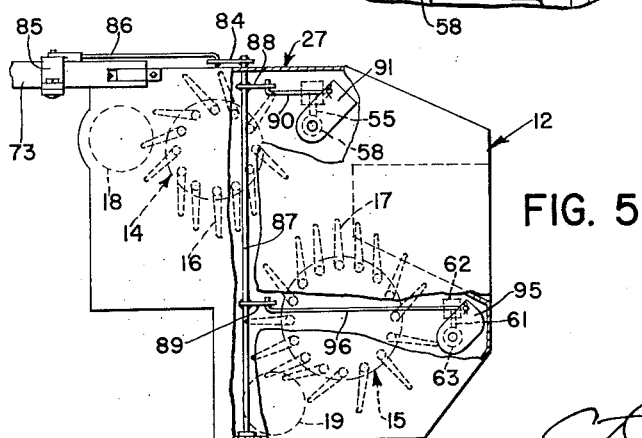
FIG. 5 is a plan view, partially in schematic of the harvesting unit.

The cotton harvester is of the type mounted on the rear of a tractor, part of which is shown, indicated in its entirety by the reference numeral 10 and is so mounted on the tractor so that movement of the harvester forwardly will be created by the tractor moving in a conventional reverse direction. As is obvious, the tractor 10 is the main mobile frame for the harvester. The cotton harvester, indicated in its entirety by the reference numeral 11 includes a conventional type forwardly disposed cotton picking unit 12 having forward points, one of which is shown at 13, on opposite sides of the plant passage. Contained within the cotton picking unit 12 are a pair of picking drums 14, 15 having picking spindles 16, 17 and disposed on opposite sides of the plant passage so that the spindles will contact the plants passing through the passage and pick the cotton bolls from the plants. Also contained in the picker housing are a pair of doffing mechanisms indicated in their entirety in FIG. 5 by reference numerals 18, 19. The picking units further include a picker housing or casing including outer upright wall structures 25, 26 adjacent the picking drums 14, 15. Further housing provided is an upright horizontally disposed box structure 27 which overlies the plant passage and interconnects the outer walls 25, 26. The upper box structure 27 contains therein the various drive mechanisms, not shown, for the picking units as well as part of the linkages, herein to be described, which moves the moistening mechanisms into and out of position.

The cotton harvester 10 has a basket or container 30 which receives cotton through a duct 31. The duct 31 receives cotton from a suction conveyor including a blower 32 drawing air through suction ducts 33 with downwardly extending inlets 34, 35 which convey cotton from the respective picking and doffing mechanisms 14, 18 and 15, 19.

Power for driving the picking unit is received from the power take-off shaft of the tractor through a suitable drive mechanism terminating in a rearwardly extending drive shaft positioned under a shield 40. An operator's platform 41, serving as an operator's station for the harvester, is provided with a seat 42 and a steering wheel 43.

The main frame of the tractor also supports a liquid-filled drum 45 containing a suitable moistening agent for the spindles. A downwardly extending hose or tubing 46 feeds fluid through first and second shut-off valves 47, 48, respectively through a filtering cup 49, and then through a suitable fluid conduit or tubing 50 leading to a pair of moistener mechanisms 52, 53.

The moistener mechanism 52 is composed of a series of vertically spaced apart moistener arms 55. Mounted on the outer end of the arms 55 are moistener pads 56, conventionally of a rubber or flexible material, engaging the picking spindles 16. The inner ends of the arms 55 are supported on an upright shaft or columnar structure 58 which is mounted in the housing structure so as to permit the moistener arms 55 to swing laterally between a position spaced from the spindles 16 and a position in engagement with the spindles 16. Extending through the shaft structure 58 is suitable tubing, not shown, connected with metering means, not shown, but contained in a housing 59, through which liquid is permitted to flow through the hollow arms 55 into the moistener pads 56. The lower end of the tubing 50 has a T-coupling 60 therein directing fluid into the metering means of moistener mechanisms 52, 53.

The right metering mechanism 53 is constructed substantially as the left metering mechanism and includes therein a series of vertically spaced moistener arms 61 having moistener pads 62 at their outer ends and fixed at their inner ends to a hollow upright shaft 63 which is mounted on the picker housing so as to rock about its upright axis to cause the moistener pads 62 to move into and out of engagement with the picker spindles 17. At the upper end of the hollow shaft 63 is a metering device contained within the metering housing 64.

The moistener mechanisms 52, 53 have been shown and described only in general form. However, should details of the mechanism as well as their means of moving the moistener pads 56, 62 into and out of position of engagement with the respective spindles 16, 17 be desired, such may be had by reference to the aforementioned Meier patent.

The picking unit 12 is supported on the main frame of the tractor by means of a subframe 70 fixed by suitable means to the tractor which supports at its rear end for rocking motion a transverse rockshaft 71. The rockshaft 71 has forwardly extending rockarm means 72, 73 which connect to the upper housing or casing 27 and suspends the entire picking unit in cantilever fashion on the transverse rockshaft 71. The rockshaft 71 is caused to rock by means of an arm 74 connected at its outer end to a link 75 extending to the hydraulic power lift system of the tractor. A suitable shock absorbing system 76 is provided between the subframe 70 and a second upwardly extending arm 77. Other details of mounting the picking unit 12 on the tractor are not shown nor described in detail. However, if such detail is desired, such may be had by reference to the aforementioned Thomann patent.

Also fixed to the shaft 71 is an upwardly extending bracket or rockarm 80 having a link or rod 81 extending to the lower or second shut-off valve 48. The shut-off valve 48 will operate upon rotation of or is responsive to movement of the rockshaft 71 to shut off or permit flow of liquid from the tank 45 into the line 50. The valve 48 is of a conventional design, and as such, it is felt that detail of the valve is not necessary as long as the function of the valve is completely and fully understood. Generally it should be recognized it is downstream from the first or upper valve 47. The first or upper shut-off valve 47 is controlled by a lever or control element 82 mounted on the operator's platform 41 and connected to the valve 47 by a rod 83. If it is desired to shut off the flow of liquid entirely, such may be done by movement of the lever 82. Conversely, before any liquid may flow through the tubular members 46, 50, the valve 47 must be manually opened by the lever 82.

In normal operation, therefore, the lever 82 is positioned to open the valve 47 so that fluid may pass into the valve 48 and, if open, through the tubing 50 to the respective moistener mechanisms 52, 53. Upon the rockshaft 71 being adjusted to place the picker unit 12 in a down or operating position, the rod 81 will cause the valve 48 to be closed. However, upon the rockshaft 71 being adjusted to raise the picker unit 12 to a transport position, the lever 80 and rod 81 will effect opening of the valve 48 to cause the fluid to pass through the tubing 50. Since the picking unit 12 will normally be in transport position upon the harvester reaching the end of the row and turning to harvest the next row, flushing or cleaning will occur at the end of each row.

Figure 1:
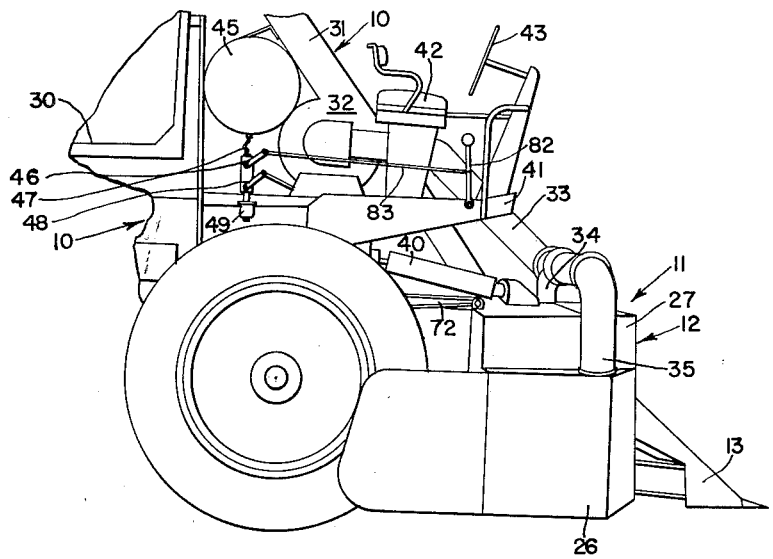
FIG. 1 is a side view of the front portion of the cotton picker.
Figure 6:
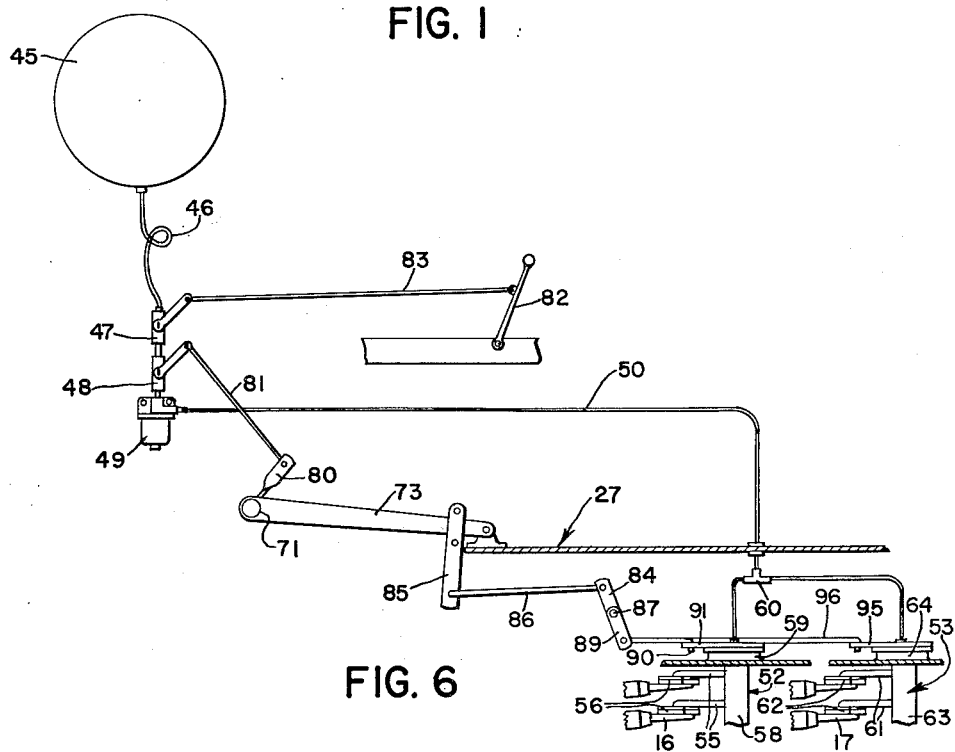
FIG. 6 is a schematic view of the moistener system employed in the cotton harvester.
Figure 2:
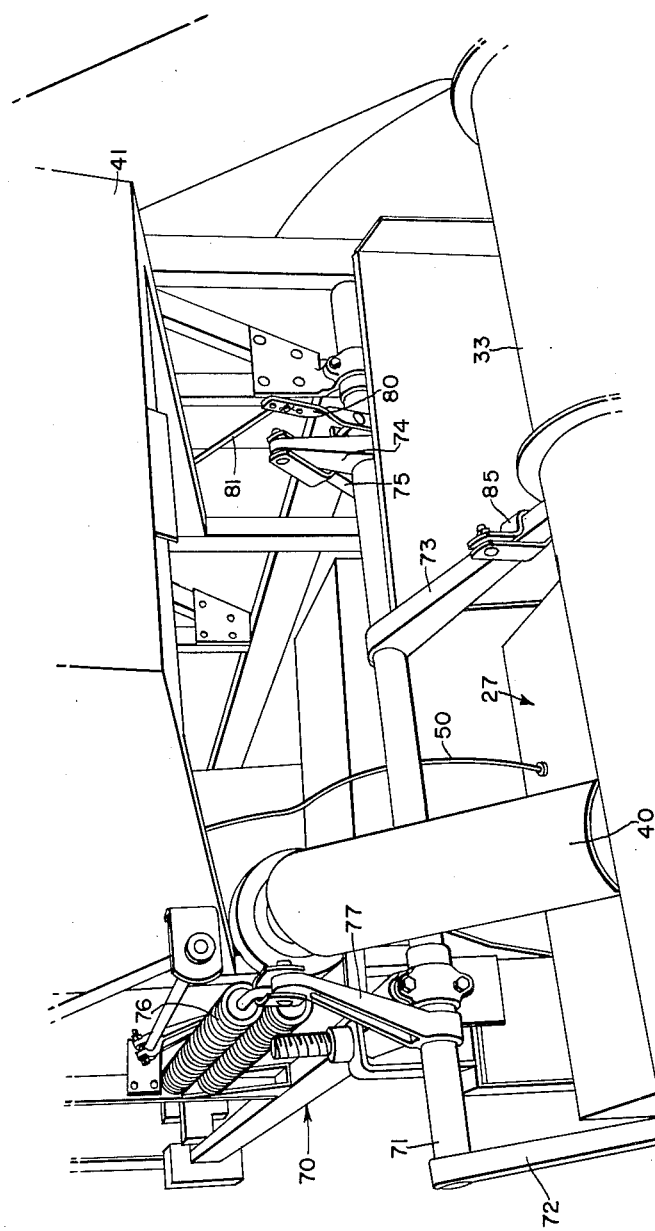
FIG. 2 is an enlarged front and overhead perspective view looking down into the front portion of the cotton harvester.
Figure 3:
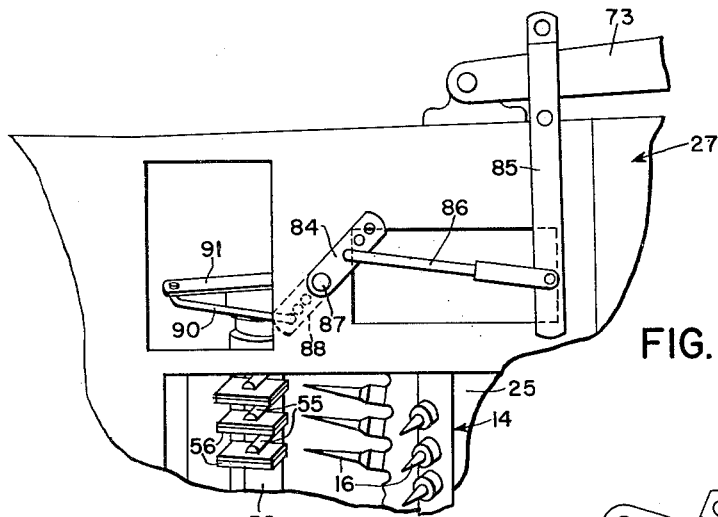
FIG. 3 is an enlarged perspective view taken from the front and left hand side of the cotton picker and looking into a portion of the cotton picker.
Figure 4:
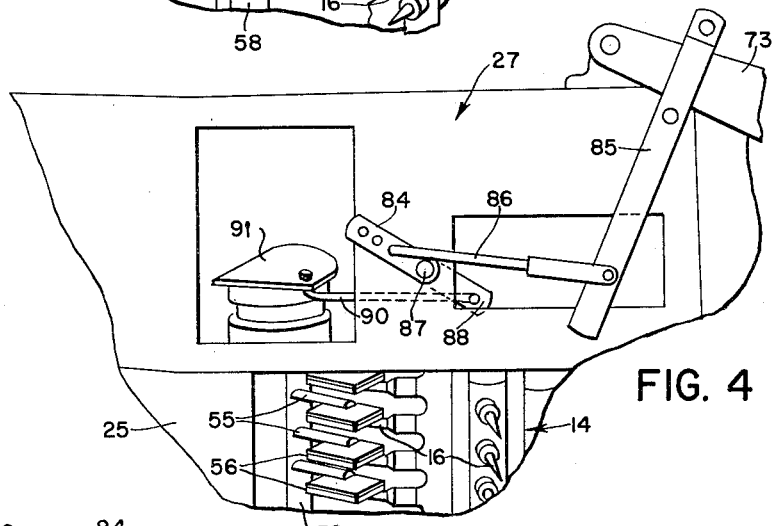
FIG. 4 is a view similar to FIG. 3, but being somewhat of a larger perspective, showing the mechanism in FIG. 3 in a different position.

Fixed rigidly with the arm 73 is a downwardly projecting bracket 85, the lower end of which is connected to a forwardly extending rod 86. Journaled to the fore-and-aft extending upright walls of the upper housing 27 is a transverse shaft 87. The left end of the shaft 87 extends outwardly of the wall and has an upwardly projecting arm 88 connected to the forward end of the rod 86. The shaft 87 has mounted thereon a pair of depending and transversely spaced apart arms 88, 89 disposed rearwardly of the moistening mechanisms. Extending from the left arm 88 is a forwardly extending rod 90 having its forward end pivoted to a plate 91, the latter being fixed to the metering housing 59 and the upright hollow shaft or columnar member 58. Viewing FIGS. 3 and 4, it becomes apparent that when the arm 73 is moved to a lower position (FIG. 3), the bracket 85 will cause rotation of the transverse shaft 87 so that the plate 91 is positioned forwardly. In this position the moistener arms 55 and the associated pads 56 are positioned outwardly and away from the spindles 16. Upon the arm 73 being raised to move the picking unit 12 in transport position, the bracket 85 will drive the arm 88 forwardly to draw the plate member 91 rearwardly. This will place the arms 55 and the associated pads 56 in a position in which the pads 56 contact the spindles 16. The latter position is shown specifically in FIG. 4.

The arm 89 is connected to a plate 95 fixed to the right hollow shaft or columnar member 63 of the moistener mechanism 53. A rod 96 extends from the lever or arm 89 to the plate 95. The rod 96 and plate 95 operate in a manner similar to the rod 90 and plate 91 and in unison therewith. Consequently, upon raising of the arm 73 the moistener arms 55, 61 will swing their respective pads 56, 62 into positions of engagement with the spindles 16, 17 respectively. Upon lowering of the arms 73, the rods 90, 96 and plates 91, 95 will swing their respective moistener arms 55, 61 into positions in which the respective moistener pads 56, 62 are clear of engagement with the respective spindles 16, 17.

Viewing the structure as a whole, it becomes apparent that movement of the rockarms 71, 73 to raise or lower the unit 12 to transport or operative position will automatically cause the valve 48 to open or close to effect movement of fluid into the moistener mechanism. Therefore, the bracket 80 and rod 81 serve as means responsive to raising and lowering of the casing or picking unit to open and shut the shut-off valve 48. At the same time, the linkage extending from the arm 85 to the respective moistener mechanisms 52, 53 will serve as means responsive to raising and lowering of the casing or picking unit to cause the moistener pads to automatically move into or out of a position of contact with the spindles 16, 17.

While only one form of the invention has been shown, it should be recognized that other forms and variations will occur to those skilled in the art. Therefore, it should be understood that the present disclosure was set forth in detail for purposes of clearly and concisely illustrating the principles of the invention and was not meant to limit or narrow the invention beyond the broad concepts set forth in the appended claims.

What is claimed is:

1. A cotton harvester comprising: a main frame; a rockable member mounted on the frame; a picker casing; a picking drum mounted in the casing including a series of vertically spaced picking spindles; a vertically disposed moistener assembly within the casing having vertically spaced moistener pads spaced on the order of the spindles; mounting means between the moistener assembly and casing permitting movement of the pads between a first position in contact with the spindles and a second position out of contact with the spindles; a fluid container mounted on the main frame; fluid conduit means extending between the container and moistener assembly for effecting movement of fluid to the assembly; a shut-off valve in said conduit means; connecting means between the casing and the rockable member whereby the casing will move in response to movement of the rockable member between a relatively low harvesting position and a relatively high transport position; connecting means between the rockable member and the shut-off valve for automatically shutting off flow of fluid in response to the rockable member moving the casing in harvesting position and automatically opening said valve upon the rockable member moving the casing in transport position; and a linkage extending from the rockable member to the moistener assembly automatically responsive to movement of the rockable member to move the pads to said first position upon the rockable member moving the casing to transport position and to said second position upon the rockable member moving the casing to the harvesting position.

2. A cotton harvester comprising: a main frame; a transverse rockable member mounted on the frame; a picker casing; a picking drum mounted in the casing including a series of vertically spaced picking spindles; a vertically disposed moistener assembly within the casing including an upright column having radially extending moistener arms spaced on the order of the spindles; mounting means between the moistener assembly and casing permitting angular movement of the arms between a first position in contact with the spindles and a second position out of contact with the spindles; a fluid container mounted on the main frame; fluid conduit means extending between the container and moistener assembly for effecting movement of fluid to the assembly; a shut-off valve in said conduit means; suspension means between the casing and the rockable member whereby the casing will move in response to movement of the rockable member between a relatively low harvesting position and a relatively high transport position; connecting means between the rockable member and the shut-off valve automatically shutting off flow of fluid in response to the casing moving to harvesting position and automatically opening said valve upon the casing moving to transport position; and linkage extending from the rockable member to the moistener assembly effective to move the arms to said first position upon the rockable member moving the casing to transport position and to said second position upon the rockable member moving the casing to the harvesting position.

3. A cotton harvester comprising: a main frame; a picker casing; a picking drum mounted in the casing including a series of vertically spaced picking spindles; a vertically disposed moistener assembly within the casing including an upright column having radially extending moistener arms spaced on the order of the spindles; mounting means between the moistener assembly and casing permitting angular movement of the arms between a first position in contact with the spindles and a second position out of contact with the spindles; a fluid container mounted on the main frame; fluid conduit means extending between the container and moistener assembly for effecting movement of fluid to the assembly; a shut-off valve in said conduit means; suspension means between the frame and casing, said suspension means being adjustable to effect positioning of the casing between a relatively low harvesting position and a relatively high transport position; connecting means between the suspension means and the shut-off valve automatically shutting off flow of fluid in response to the casing moving to harvesting position and automatically opening said valve upon the casing moving to transport position; and connecting means between the suspension means and the moistener assembly effective to move the arms to said first position upon the casing moving to transport position and to said second position upon the casing moving to the harvesting position.

4. A cotton harvester comprising: a main frame; a picker casing; a picking drum mounted in the casing including a series of vertically spaced picking spindles; a vertically disposed moistener assembly within the casing including an upright column having radially extending moistener arms spaced on the order of the spindles; mounting means between the moistener assembly and casing permitting angular movement of the arms between a first position in contact with the spindles and a second position out of contact with the spindles; suspension means between the frame and casing, said suspension means being adjustable to effect positioning of the casing between a relatively low harvesting position and a relatively high transport position; and connecting means between the suspension means and the moistener assembly effective to move the arms to said first position upon the casing moving to transport position and to said second position upon the casing moving to the harvesting position.

5. A cotton harvester comprising: a main frame; a picker casing; a picking drum mounted in the casing including a series of vertically spaced picking spindles; a vertically disposed moistener assembly mounted in the casing including an upright column having radially extending moistener arms positioned to contact the spindles; a fluid container mounted on the main frame; fluid conduit means extending between the container and moistener assembly for effecting movement of fluid to the assembly; a shut-off valve in said conduit means; suspension means between the frame and casing, said suspension means being adjustable to effect positioning of the casing between a relatively low harvesting position and a relatively high transport position; and connecting means between the suspension means and the shut-off valve automatically shutting off flow of fluid in response to the casing moving to harvesting position and automatically opening said valve upon the casing moving to transport position.

6. A cotton harvester comprising: a main frame; a transverse rockshaft mounted on the frame; a picker casing disposed forwardly of the rockshaft; a picking drum mounted in the casing including a series of vertically spaced picking spindles; a vertically disposed moistener assembly within the casing having vertically spaced moistener pads spaced on the order of the spindles; mounting means between the moistener assembly and casing permitting movement of the pads between a first position in contact with the spindles and a second position out of contact with the spindles; a fluid container mounted on the main frame; fluid conduit means extending between the container and moistener assembly for effecting movement of fluid to the assembly; a shut-off valve in said conduit means; a first rockarm extending above the casing; means connecting the casing in suspending relation on the rockarm whereby the casing will move in response to movement of the rockshaft between a relatively low harvesting position and a relatively high transport position; a second rockarm extending from the rockshaft; connecting means between the second rockarm and the shut-off valve for automatically shutting off flow of fluid upon the casing moving to harvesting position and autocatically opening said valve upon the casing moving to transport position; linkage extending between the first rockarm and the moistener assembly automatically responsive to movement of the first rockarm to move the pads to said first position upon the casing being moved to transport position and to said second position upon the casing being moved to harvesting position.

7. A cotton harvester comprising: a main frame; a transverse rockshaft mounted on the frame; a picker casing disposed forwardly of the rockshaft; a picking drum mounted in the casing including a series of vertically spaced picking spindles; a vertically disposed moistener assembly including a series of vertically spaced moistener arms supported on an upright columnar member rockably mounted in the casing to permit the arms to swing between a first position in contact with the spindles and a second position out of contact with the spindles; rockarm means extending above the casing; means connecting the casing in suspending relation on the rockarm means whereby the casing will move in response to movement of the rockshaft between a relatively low harvesting position and a relatively high transport position; linkage extending between the rockarm means and the moistener assembly automatically responsive to movement of the rockshaft to swing the arms to said first position upon the casing being moved to transport position and to said second position upon the casing being moved to harvesting position.

8. A cotton harvester comprising: a main frame; a transverse rockshaft mounted on the frame; a picker casing disposed forwardly of the rockshaft; a picking drum mounted in the casing including a series of vertically spaced picking spindles; a vertically disposed moistener assembly mounted in the casing; a fluid container mounted on the main frame; fluid conduit means extending between the container and moistener assembly for effecting movement of fluid to the assembly; a shut-off valve in said conduit means; rockarm means extending above the casing; means connecting the casing in suspending relation on the rockarm means whereby the casing will move in response to movement of the rockshaft between a relatively low harvesting position and a relatively high transport position; and connecting means between the rockarm means and the shut-off valve for automatically shutting off flow of fluid upon the casing moving to harvesting position and automatically opening said valve upon the casing moving to transport position.

9. A cotton harvester comprising: a main frame; an operator's station on the frame; a transverse rockshaft mounted on the frame; a picker casing disposed forwardly of the rockshaft; a picking drum mounted in the casing including a series of vertically spaced picking spindles; a vertically disposed moistener assembly mounted in the casing; a fluid container mounted on the main frame; fluid conduit means extending between the container and moistener assembly for effecting movement of fluid to the assembly; first and second shut-off valves in said conduit means, the second being downstream from the first; rockarm means extending above the casing; means connecting the casing in suspending relation on the rockarm means whereby the casing will move in response to movement of the rockshaft between a relatively low harvesting position and a relatively high transport position; connecting means between the rockarm means and the second shut-off valve for automatically shutting off flow of fluid upon the casing moving to harvesting position and automatically opening said valve upon the casing moving to transport position; a control element on the frame adjacent the operator's station; and means connecting the control element to said first shut-off valve for opening or closing the latter.

10. A cotton harvester comprising: a main frame; a picker casing; a picking drum mounted in the casing including a series of vertically spaced picking spindles; a moistener assembly within the casing positionable between a first position in contact with the spindles and a second position out of contact with the spindles; a fluid container mounted on the main frame; fluid conduit means extending between the container and moistener assembly for effecting movement of fluid to the assembly; a shut-off valve in said conduit means; adjusting means on the frame adjustably supporting the casing between a relatively low harvesting position and a relatively high transport position; means responsive to raising and lowering of the casing to automatically open and close the shut-off valve; and means responsive to raising and lowering of the casing to automatically move the moistener assembly to said first and second positions.

11. A cotton harvester comprising: a main frame; a picker casing; a picking drum mounted in the casing including a series of vertically spaced picking spindles; a moistener assembly within the casing positionable between a first position in contact with the spindles and a second position out of contact with the spindles; adjusting means on the frame adjustably supporting the casing between a relatively low harvesting position and a relatively high transport position; and means responsive to raising and lowering of the casing to automatically move the moistener assembly to said first and second positions.

12. A cotton harvester comprising: a main frame; a picker casing; a picking drum mounted in the casing including a series of vertically spaced picking spindles; a moistener assembly within the casing; a fluid container mounted on the main frame; fluid conduit means extending between the container and moistener assembly effecting movement of fluid to the assembly; a shut-off valve in said conduit means; adjusting means on the frame for adjustably supporting the casing between a relatively low harvesting position and a relatively high transport position; and means responsive to raising and lowering of the casing to automatically open and close the shut-off valve.

References Cited in the file of this patent
UNITED STATES PATENTS

| | | |
|---|---|---|
| 2,140,631 | Johnston | Dec. 20, 1938 |
| 2,787,880 | Fergason | Apr. 9, 1957 |
| 2,795,096 | Meier | June 11, 1957 |
| 2,795,917 | Meier | June 18, 1957 |